Nov. 7, 1933.   E. E. WEMP   1,934,109
CLUTCH
Original Filed May 14, 1928   2 Sheets-Sheet 1

INVENTOR
Ernest E. Wemp
BY
Stuart C. Barnes
ATTORNEY

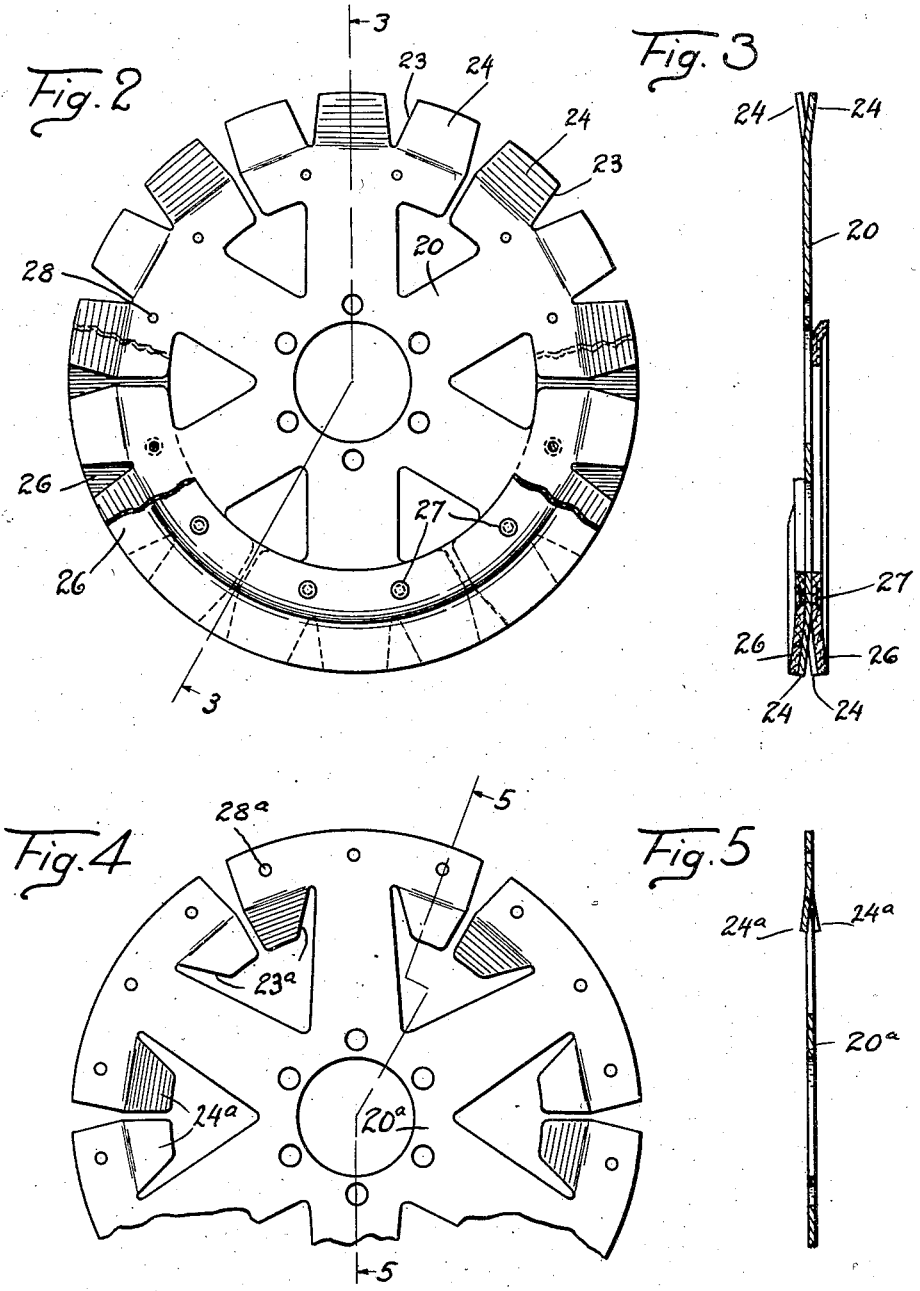

Patented Nov. 7, 1933

1,934,109

UNITED STATES PATENT OFFICE 1,934,109

CLUTCH

Ernest E. Wemp, Detroit, Mich.

Application May 14, 1928, Serial No. 277,470
Renewed March 30, 1933

8 Claims. (Cl. 192—107)

This invention relates to a clutch especially adapted for use in an automotive vehicle.

The object of the invention is to provide an improved construction which gives a nicety of action when the clutch is operated to establish a driving connection between an engine and mechanism driven thereby. The construction includes a disk-like member provided with a facing material for effecting frictional engagement with another clutch part. This member to which the frictional engaging material is attached is constructed so that it flexes in the operation of the clutch. This flexing takes place at a point in close proximity to the frictional engaging material, and it is a further object of the invention to so associate this flexing member and the engaging material so that there will be no binding between these two members when the flexing takes place, and so that the frictional engaging material will not be unduly distorted, broken, or otherwise rendered defective.

In the drawings:

Fig. 2 is a face view of a member of the clutch constructed in accordance with the invention with some of the friction material cut away.

Fig. 3 is a section on line 3—3 of Fig. 2.

Fig. 4 is a view similar to Fig. 3 illustrating the modified form.

Fig. 5 is a section taken on line 5—5 of Fig. 4.

Figure 1:
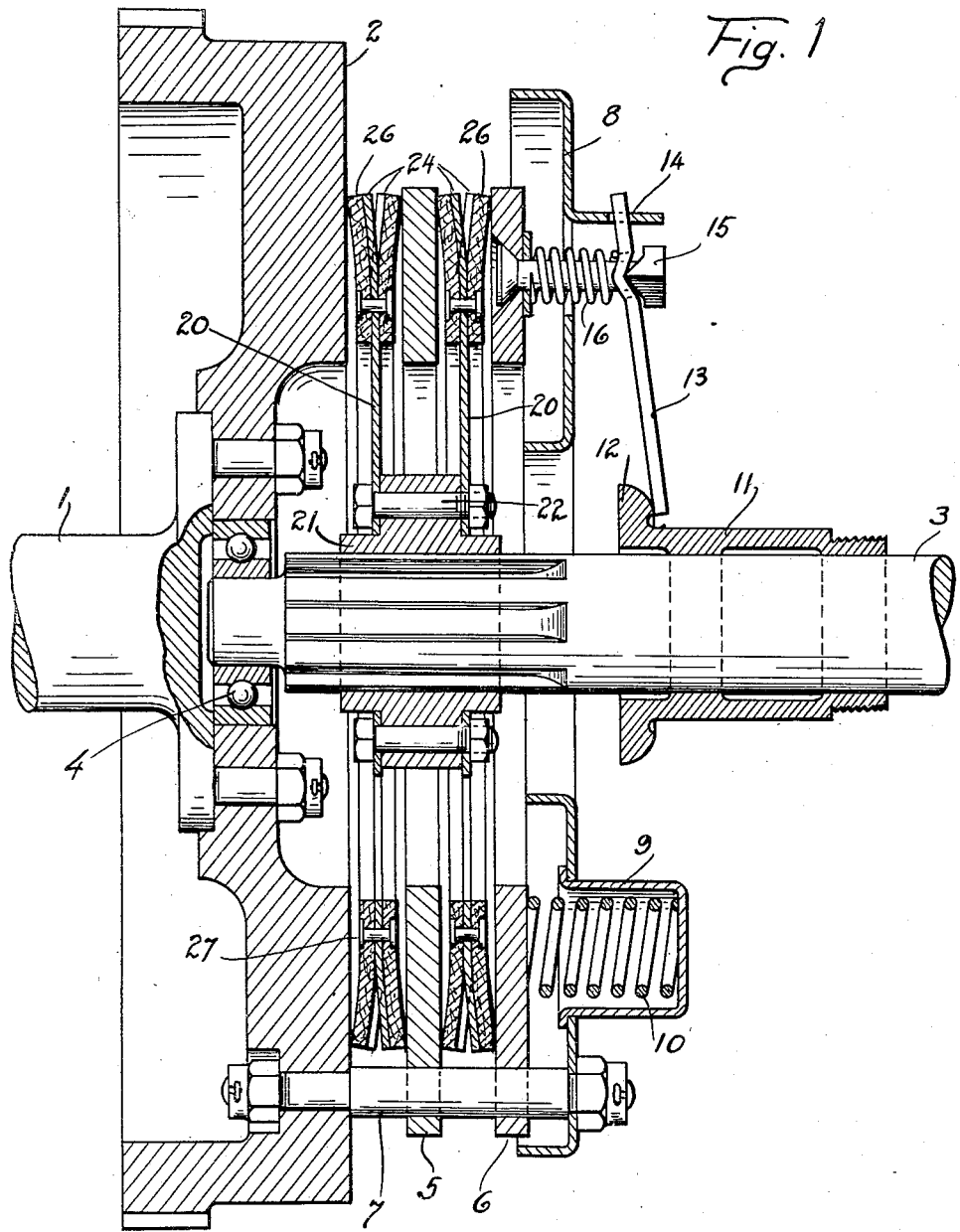
Fig. 1 is an assembly view in section showing a clutch construction embodying the invention with the clutch in released position.

In the accompanying drawings a driving shaft, which may be the crank shaft of an engine, is shown at 1, and mounted on the shaft is a fly wheel 2. A shaft 3 is driven through the clutch construction soon to be described, and one end of this shaft is journaled in a suitable bearing 4. This shaft 3 is ordinarily the main driving shaft extending into the conventional transmission.

The clutch construction embodies driving members 5 and 6 connected to the fly wheel by means of bolts 7 with these driving members slidable upon the bolts. A cover plate 8 is provided which is also carried by the bolts 7. The cover plate is provided with devices for holding packing springs; these devices may take the form of cup-like members 9 each for holding a spring 10 which tends to pack the driving members and the fly wheel together. One face of the fly wheel in the present construction acts as a driving member.

For the purpose of controlling the action of the clutch, a sleeve 11 may be mounted on the shaft 3 and provided with a collar 12 which engages levers 13 fulcrumed as at 14 on the cover plate and operably associated with the bolts 15 connected to the driving member 6. There may be a coil spring 16 interposed between the plate 6 and each lever for holding the lever outwardly against the headed end of the bolt 15.

The construction thus described represents one form of clutch structure in which the present invention can be used. This structure need not be described in further detail, inasmuch as such an arrangement is well known to those versed in the art; for example, there are a number of packing springs 10 arranged circumferentially around the cover plate, and also a number of operating levers 13 all of which contact with the collar 12 on the sleeve, and a bolt for each lever.

The driven parts of the clutch plates are disks 20 which may be connected to a hub 21 by means of suitable bolts 22 with the hub splined to the shaft 3.

Referring to Fig. 2, it will be noted that the disk 20 is of spoked formation and that each spoke has an enlarged end portion. More specifically, the spokes are enlarged circumferentially at their ends. Each enlarged end of the spoke is notched in from the outer edge, as at 23, thus providing end members in the nature of wings 24, there being three wings for each spoke.

Alternating wings are arranged to extend angularly with regards to the plane of the disk and in opposite directions. One wing may be bent slightly with regards to the disk in one direction and the next adjacent wing may be bent in a similar manner in the opposite direction, as indicated in Fig. 3. This bending of wings is shown in the several views of the drawings in quite an exaggerated manner for the purpose of clearness in depicting the invention. The material of which the disk is made is more or less springy so that the wings retain this position normally but can be flexed. The line of flexing movement is illustrated at 25 and this line occurs substantially at the point where the wings are bent angularly as regards the disk. This line of bending is substantially a normal to an adjacent radial line.

Each disk is provided with frictional engaging material 26. This material has a width which is greater than the wings and is secured to the disk at points other than the wings on the disk. For this purpose the material may be secured to the disk by means of rivets 27 extending through the material and the disk through the holes 28. It will be noted that the frictional engaging material is thus secured tightly to the disk at points in the disk which always remain in the same plane.

In Fig. 1, the clutch construction is shown in released position. This is effected in the well known manner by sliding the sleeve 11 from left to right by a suitable pedal or lever, thus retracting the driving member 6 against the action of the packing springs. In this position the wings on the driven disks assume their normal deflected positions and thus separate the outer edges of the frictional engaging material. When the clutch is engaged, the packing springs cause the driving members to move together and the first engagement with the driven member is substantially a line contact with the outer edges of the frictional engaging material, as will be appreciated by an inspection of Fig. 1. As the engagement of the clutch progresses, the wings are flexed in toward the plane of the driven disk, and there occurs a progressive increase of surface of frictional engagement between the driving members and the frictional material on the driven member. This construction gives a nicety of action in the clutching operation.

The frictional engaging material employed is preferably a rather stiff composition and it will be appreciated that if this material were tied to the flexing wings that there would be a binding between the disk and the engaging material upon the flexing of the wings. This would result in undue distortion of the material with the probabilities of shortening the life of the clutch.

However, the clutch material is secured to the non-flexing face of the disk only, and not attached to both this part of the disk and the wings. Accordingly, there is freedom for relative movement between the flexible wings and the frictional material.

In Figs. 4 and 5 a modified form is shown. In this form notches 23a are reversed in position with respect to the notches 23, so as to provide wings 24a, alternate ones of which are oppositely deflected from the plane of the disk. In this instance the frictional engaging material may be secured in close proximity to the outer edge of the disk as by means of suitable rivets taken through openings 28a. It will be understood that the outer ends of the enlarged spokes in this form remain in the fixed plane of the disk and the inwardly extending wings 24a only are deflected from this plane. In this form it would be the inner edge of the frictional engaging material which would first come into driving contact with the driving members of the clutch instead of the outer edge as shown in Fig. 1.

The provision of two notches in each spoke so as to provide three wings, as illustrated in Fig. 3, or two wings, as illustrated in Fig. 4, is thought to be an advantageous and preferred construction although it is within the invention to provide a different number of wings; for example, in the form shown in Fig. 2 by the mere expedient of placing more notches in the enlarged ends of the spokes a greater number of wings can be had while only one notch will provide two wings. It is also within the invention to provide a clutch having the two driven members as shown in Fig. 1, or a clutch having more than two or even one driven member.

While the invention is shown as being embodied in a clutch having two driven disks, the prevailing clutch construction at the present time is the use of only a single driven disk, and the invention is applicable to a single disk clutch construction as well as to the clutch construction as shown.

By thus constructing the driven member of the clutch the facing material, or the material which frictionally engages the driving member, may be secured to the disk by any suitable number of securing means such as rivets, bolts, or the like. In other words, the engaging material is secured directly against a non-flexing face of the disk, and rivets may be secured therethrough in as many places as is necessary to make an adequate connection. The flexing parts are out of the way, so to speak, and offer no incumbrance to the securing of the engaging material to the disk.

I claim:

1. In a clutch, a driven member substantially in the form a disk notched to provide circumferentially arranged wings on its periphery with alternate wings extending angularly in opposite directions from the plane of the disk which are flexed upon operation of the disk, each of said wings extending angularly from a line substantially normal to an adjacent radial line, and frictional engaging material secured to the disk at points removed from the wings, said material overlying the wings whereby freedom of movement between the wings and the material is permitted upon flexing of the wings.

2. In a clutch, a driven member substantially of disk form and having a plurality of substantially radial notches providing spaced wings, each of said wings being bent angularly with respect to the plane of the disk substantially on a line connecting two notches, and alternate wings extending angularly in opposite directions, the points of bending of the wings when considered as a whole, forming a circular line of bending substantially parallel with the circumference of the disk, and frictional engaging material secured on one side of this line of bending and overlapping the wings.

3. A driven member for a clutch comprising a substantially disc-shaped member, having a plurality of notches cut into its periphery to provide a wing between notches, said wings being bent angularly from the plane of the disc member, each on a line substantially connecting the bottoms of the notches defining the respective wing, which line is substantially perpendicular to a radial line intersecting the same, alternate wings extending in opposite directions, and clutch facing material connected to the disc and overlying the wings.

4. In a clutch, a clutch driven member substantially of disk form adapted to be mounted on its axial center, spoke-like members forming the body of the disk and extending radially between the inner and outer portions of the disk, friction material secured to the outer portion of the disk, and wing-like members over which the friction material is mounted and carried by the outer end portions of the spoke-like members, said wing members extending angularly as regards the plane of the disk with alternate wings extending angularly in opposite directions.

5. In a clutch, a driven member of disk form having a central portion and radially extending spokes of T formation with the cross bars of the T formations cooperating to form the periphery of the disk, the cross bar of each T shaped spoke being provided with a wing extending angularly as regards the plane of the disk, each spoke having a wing which extends in a direction opposite to that of the wing carried by the next adjacent spoke, and friction material secured to the disk and overlying the wings.

6. A driven disk for a clutch, comprising a disk-like member having a central portion with radially and outwardly extending spokes of T formation, with the cross bars of the T's cooperating to provide the outer edge of the disk, the cross bar of each spoke having a plurality of wings which extend angularly from the plane of the disk in opposite directions, and clutch facing material overlying the wings.

7. A clutch member comprising a circular body formed of radially extending spokes rigid with each other at the hub and spaced apart at their outer ends with the spaced spoke ends forming a broken periphery for the circular body, a ring of facing material on each side of the body near its outer periphery, and fastening members for securing the rings of facing material to said member and passing through the rings of facing material entirely on one side of a center line between the inner and outer peripheral edges of said rings of facing material.

8. A clutch member comprising a circular body formed of radially extending spokes rigid with each other at the hub and spaced apart at their outer ends with the spaced spoke ends forming a broken periphery for the circular body, a ring of facing material on each side of the body near its outer periphery, said spokes having portions lying outside of a central plane through the body serving to hold adjacent edge portions of the rings axially spaced from each other, and fastening members for securing the rings of facing material to said member and passing through the rings of facing material and spokes entirely on one side of a center line between the inner and outer peripheral edges of said rings of facing material and between said center line and the edges of the rings opposite the said axially spaced edges.

ERNEST E. WEMP.